(12) United States Patent
Gomi et al.

(10) Patent No.: US 6,371,728 B1
(45) Date of Patent: Apr. 16, 2002

(54) IMPELLER FOR HYDRAULIC POWER TRANSMITTING APPARATUS AND METHOD OF FIXING BLADES OF HYDRAULIC POWER TRANSMITTING APPARATUS

(75) Inventors: Kenji Gomi; Toshihide Aoki, both of Shizuoka-ken (JP)

(73) Assignee: Kabushiki Kaisha Yutaka Giken, Shizuoka-ken (JP)

( * ) Notice: Subject to any disclaimer, the term of this patent is extended or adjusted under 35 U.S.C. 154(b) by 12 days.

(21) Appl. No.: 09/645,519

(22) Filed: Aug. 25, 2000

(30) Foreign Application Priority Data

Aug. 27, 1999 (JP) .............................. 11-242099
Aug. 9, 2000 (JP) .......................... 12-241196

(51) Int. Cl.[7] ................................................ F01D 5/14
(52) U.S. Cl. .............................. 416/197 C; 416/204 R; 29/889.5
(58) Field of Search ............................ 416/197 C, 180, 416/204 R; 60/330, 364, 366, 367; 29/889.5, 889.2, 505

(56) References Cited

U.S. PATENT DOCUMENTS 6,036,439 A * 3/2000 Mizobuchi et al. ...... 415/213.1
6,237,221 B1 * 5/2001 Mizobuchi ................. 29/889.5

FOREIGN PATENT DOCUMENTS

JP      57-79359      5/1982
JP      8-254230      10/1996

* cited by examiner

*Primary Examiner*—Edward K. Look
*Assistant Examiner*—Kimya McCoy
(74) *Attorney, Agent, or Firm*—Arent Fox Kintner Plotkin & Kahn, PLLC

(57) ABSTRACT

An impeller for a hydraulic power transmitting apparatus has a shell and a plurality of blades fixed to the shell. Each of the blades has a blade main body and a fixing flange which is bent at an angle relative to the blade main body. The shell and the fixing flange are placed one on top of the other and are pressed together at a fixing point such that a hollow cylindrical projection having a bottom is formed. The projection is made up of a diametrically expanded portion along a bottom outer periphery of that member out of the shell and the fixing flange which lies on an inner side in the projection. The expanded portion is thrusted into that member out of the shell and the fixing flange which lies on an outer side in the projection.

17 Claims, 5 Drawing Sheets

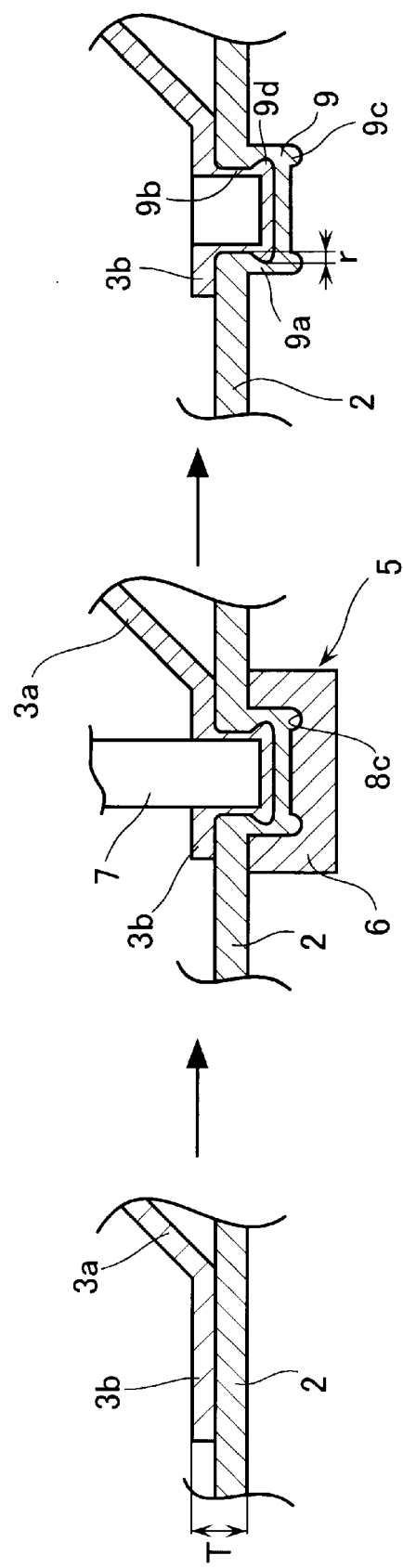

IMPELLER FOR HYDRAULIC POWER TRANSMITTING APPARATUS AND METHOD OF FIXING BLADES OF HYDRAULIC POWER TRANSMITTING APPARATUS

BACKGROUND OF THE INVENTION

1. Field of the Invention

The present invention relates to an impeller for a hydraulic power transmitting apparatus and a method of fixing blades of a hydraulic power transmitting apparatus. In particular, it relates to an impeller as well as method of fixing the blades of the impeller, and of fixing a lock-up damper spring plate without making a hole or slit in any of constituting members.

2. Description of Related Art

In a conventional hydraulic power transmitting apparatus, as a means of fixing blades to a shell, there are known the following, i.e., means of fixing both the members by welding or brazing, or means of fitting claws provided in the blades into slits and then fixing them together by caulking or brazing (see Japanese Published Unexamined Patent Application No. 79359/1982). In the above-described conventional art, welding or brazing will give rise to thermal strains to the shell and the blades. Particularly, in case of brazing, a large amount of electric power is consumed in a brazing furnace. When a flux for preventing oxidation is used, there is a possibility of generating harmful gases from the flux. In case the claws provided in the blades are fitted into the slits, three-dimensional slits and the claws of the blades must be manufactured at a high accuracy in order to facilitate the assembling work. This results in a higher manufacturing cost and in a reduced strength in the shell due to the presence of the slits. In addition, since the force of fixing the blades is weak, a working fluid may leak through the slits out of the shell, resulting in a remarkable reduction in the performance of the hydraulic power transmitting apparatus.

In view of the above disadvantages accompanied by the conventional art, the present invention has an object of providing an impeller for a hydraulic power transmitting apparatus and a method of fixing blades of a hydraulic power transmitting apparatus in which the shell and the blades as well as the shell and a lock-up damper spring plate can be fixed without resort to welding or brazing as well as to fitting of claws into slits.

SUMMARY OF THE INVENTION

In order to attain the above and other objects, according to a first aspect of the present invention, the present invention is an impeller for a hydraulic power transmitting apparatus. The impeller comprises: a shell; a plurality of blades fixed to the shell, each of the blades having a blade main body and a fixing flange which is bent at an angle relative to the blade main body; wherein the shell and the fixing flange are placed one on top of the other and are pressed together at a fixing point such that a hollow cylindrical projection having a bottom is formed; and wherein the projection comprises a diametrically expanded portion along a bottom outer periphery of that member out of the shell and the fixing flange which lies on an inner side in the projection, the expanded portion being thrusted into that member out of the shell and the fixing flange which lies on an outer side in the projection.

In a second aspect of the present invention, there is provided an impeller for a hydraulic power transmitting apparatus. The impeller comprises: a shell; a plurality of blades fixed to the shell, each of the blades having a blade main body and a fixing flange which is bent at an angle relative to the blade main body; wherein each of the shell and the fixing flange are placed one on top of the other and are pressed together at a fixing point such that a hollow cylindrical projection having a bottom is formed, an outer periphery of the bottom having an axially extending ring-shaped convex; and wherein the projection comprises a diametrically expanded portion along a bottom outer periphery of that member out of the shell and the fixing flange which lies on an inner side in the projection, the expanded portion being thrusted into that member out of the shell and the fixing flange which lies on an outer side in the projection.

Preferably, the projection is formed in a plurality of numbers, and at least one of the projections is projected inward of the impeller. According to this arrangement, in case another constituting member of the impeller is disposed in close proximity to the outside of the shell, a particular projection which is likely to interfere with the above-mentioned member can be projected inward, instead of outward as is the case with the remaining ones, to prevent the mutual interference.

Further, preferably, at least one of the projections is positioned radially inward relative to a center of radial length of the blade. Ordinarily, in the turbine blades, a large force in a direction of peeling off the blades is operated on an outlet side in an inner circumference. By arranging at least one of the projections as described above, a large fixing force against the peeling can be secured.

Preferably, the fixing flange has a larger width on a radially inner side and a diameter of a projection to be provided on the radially inner side is larger in diameter than the diameter of remaining projections. According to this arrangement, the projection of a larger diameter can generate a larger force against the peeling off the blades.

Preferably, the impeller further comprises a lock-up damper spring plate having a shape free from interference with a projection that is on a circumferentially outermost position, the damping spring plate being fixed to an outside of the shell by a projection which is the same as the projection for fixing the shell and the fixing flange. According to this arrangement, the lock-up damper spring plate can be fixed to the shell without giving rise to the interference with the projection for fixing the fixing flange and without giving rise to the thermal strains.

According to a third aspect of the present invention, there is provided a method of fixing blades of a hydraulic power transmitting apparatus. The method comprises: preparing a shell from a first metallic plate and a plurality of blades from a second metallic plate, each of the blades having an integrally formed fixing flange; placing the shell and the fixing flange one on top of the other; pressing the shell and the fixing flange together to form a hollow cylindrical projection such that a material in a corner portion of an inner member of the shell and the fixing flange inside the projection is expanded outward so as to be thrusted into a material of an outer member of the shell and the fixing flange inside the projection.

Alternatively, there is provided a method of fixing blades of a hydraulic power transmitting apparatus. The method comprises: preparing a shell made of a first metallic plate and a plurality of blades made of a second metallic plate, each of the blades having an integrally formed fixing flange; feeding the shell and each of the fixing flanges into a die assembly in a state in which one is placed on top of the other, the die assembly comprising: a die having a die hole with a bottom; and a punch which is adapted to be inserted into, and out of, the die hole; wherein a clearance between the punch and an inner surface of the die hole is smaller than a sum of thicknesses of the shell and the fixing flange, and wherein the die has a ring-shaped groove which is formed along a corner of the bottom of the die hole so as to extend in an axial direction of the die assembly; pressing the shell and the fixing flange together to form a hollow cylindrical projection such that a material in a bottom corner portion of an outer member out of the shell and the fixing flange is forced into the ring-shaped groove and that a material in a bottom corner portion of an inner member of the shell and the fixing flange is expanded diametrically outward so as to be thrusted into the material of the outer member.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is a diagram explaining the steps of pressing the shell and the fixing flange;

DETAILED DESCRIPTION OF PREFERRED EMBODIMENTS

An explanation will now be made about an embodiment of the present invention with reference to the accompanying drawings.

Figure 1:
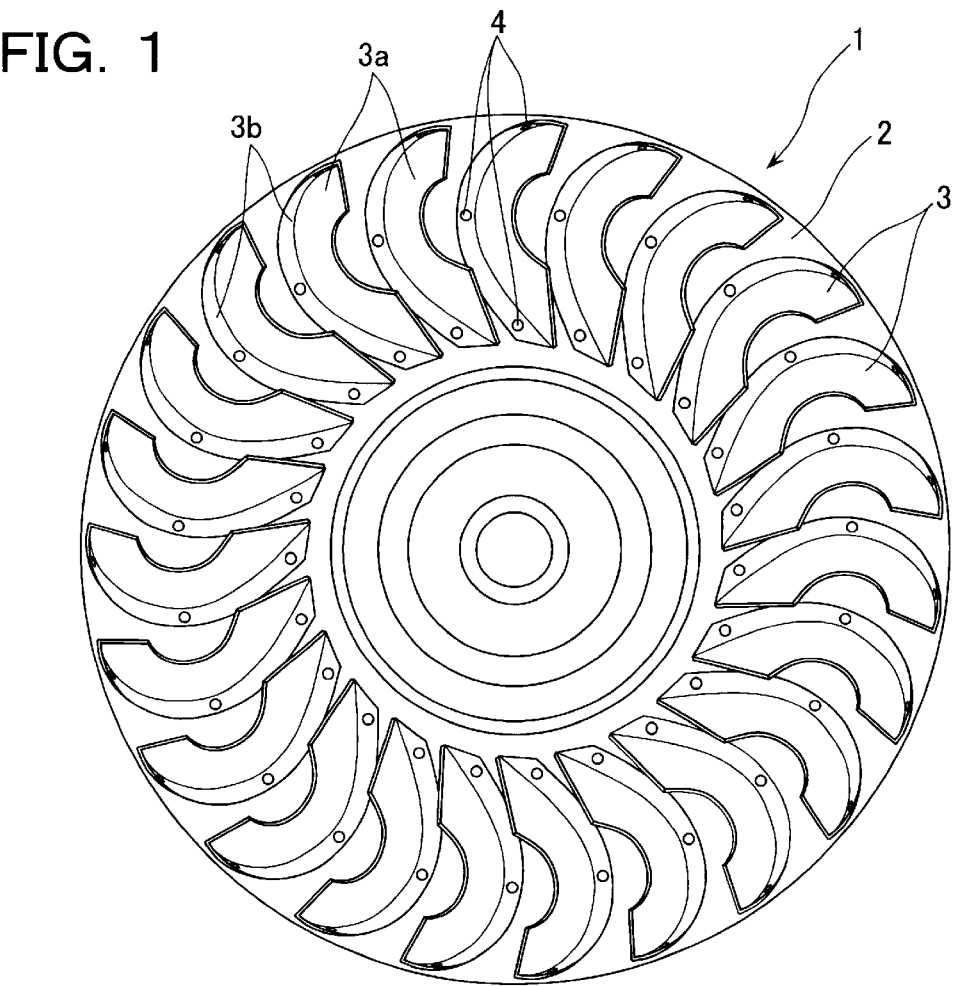
FIG. 1 is a front view of an impeller for a hydraulic power transmitting apparatus according to one embodiment of the present invention.
Figure 2:
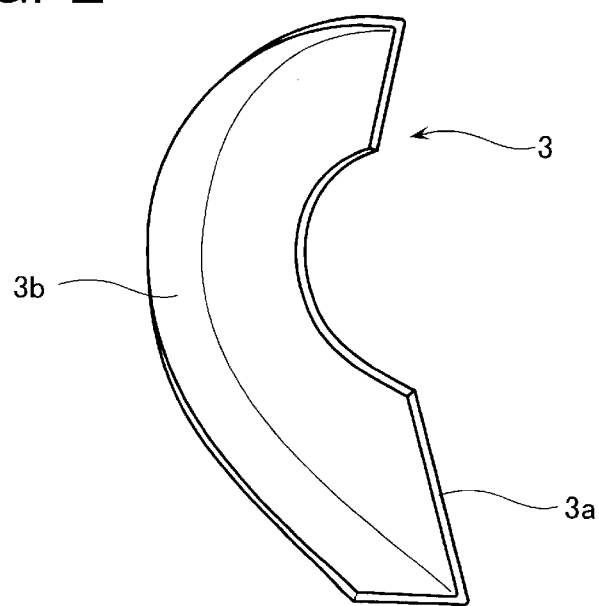
FIG. 2 is a perspective view of a blade.

In FIG. 1, reference numeral 1 denotes an impeller of a hydraulic power transmitting apparatus, reference numeral 2 denotes a shell, and reference numeral 3 denotes a blade. The shell 2 and the blade 3 are made of a metallic plate or plates such as a metallic sheet plate or plates. The blade 3 is made up, as shown in FIG. 2, of a blade main body 3a and a fixing flange 3b which is formed by bending from the blade main body 3a and which is used for fixing the blade 3 to the shell 2. In the illustrated example, the fixing flange 3b is fixed to the shell 2 at three fixing points 4 for each of the flange 3b as shown in FIG. 1.

Figure 3:
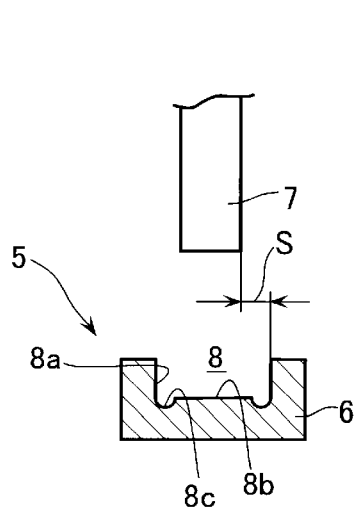
FIG. 3 is a cross-sectional view of a die assembly to be used in pressing the shell and the fixing flange of the blade of the impeller.

In order to firmly fix the shell 2 and the fixing flange 3b of the blade 3 together, a die assembly 5 shown in FIG. 3 is used. The die assembly 5 is made up of a die 6 and a punch 7. The die 6 has a die hole 8 which is formed therein. The die hole 8 is made up of a cylindrical inner circumferential surface 8a, a flat bottom surface 8b, and a ring-shaped groove 8c which is formed along a corner of the bottom of the die hole 8. The punch 7 is in a columnar shape and has a flat front (or bottom) end surface. The clearance S which is formed between the punch 7 and an inner surface of the die hole 8 is set, as shown in FIG. 3, smaller than the sum T of the thicknesses of the shell 2 and the fixing flange 3b.

The impeller is manufactured in the following manner. The shell 2 and the fixing flange 3b of the blade 3 are put together, one on top of the other, and are fed or inserted into the die assembly 5. The punch 7 is operated at the above-described fixing points 4 as shown in FIG. 4 to thereby press the shell 2 and the fixing flange 3b together. In this manner, the shell 2 and the fixing flange 3b are together subjected to the drawing work. As a result, the vertical wall portion 9a of the outer member, which is the shell 2 in the illustrated example, and the vertical wall portion 9b of the inner member, which is the fixing flange 3b in the illustrated example, are squeezed to thereby form a hollow cylindrical projection 9. At this time, due to the pressure which operates on the vertical wall portion 9a of the shell 2, the plate (or material) at the corner portion of the shell 2 is forced out into the ring-shaped groove 8c to thereby form a ring-shaped protruded portion which extends in the axial direction of the die assembly (i.e., an axially extending ring-shaped convex) 9c. Due to this flow of material and due to the difference in pressures to be operated on the vertical wall portion 9a and the vertical wall portion 9b, there is formed a diametrically expanded portion 9d in which the material at the bottom corner portion of the fixing flange 3b cuts into (or is forced or thrusted into) the vertical wall portion 9a of the shell 2 in the diametrical direction. As a result of formation of this expanded portion 9d, the vertical wall portions 9a, 9b are integrated into the projection 9, whereby the shell 2 and the blade 3 get firmly fixed together.

Figure 5:
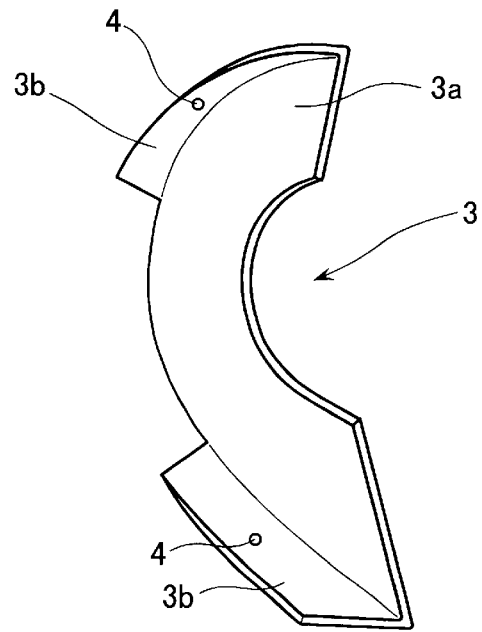
FIG. 5 is a perspective view of a blade in a modified embodiment of the present invention.

It is preferable to provide two or three fixing points 4 in each fixing flange 3b. In order to reduce the weight of the impeller, it is preferable, as shown in FIG. 5, to cut off the portion other than the neighborhood of the fixing points 4.

In the above-described embodiment, the inner circumference of the die hole 8 and the external circumference of the punch 7 are of a cylindrical shape. However, they may be provided with a draft (taper) to facilitate the pulling out of the product. The flat bottom surface 8b of the die hole 8 and the front end surface of the punch 7 may be formed into gradually curved surfaces or tapered surfaces.

Figure 6:
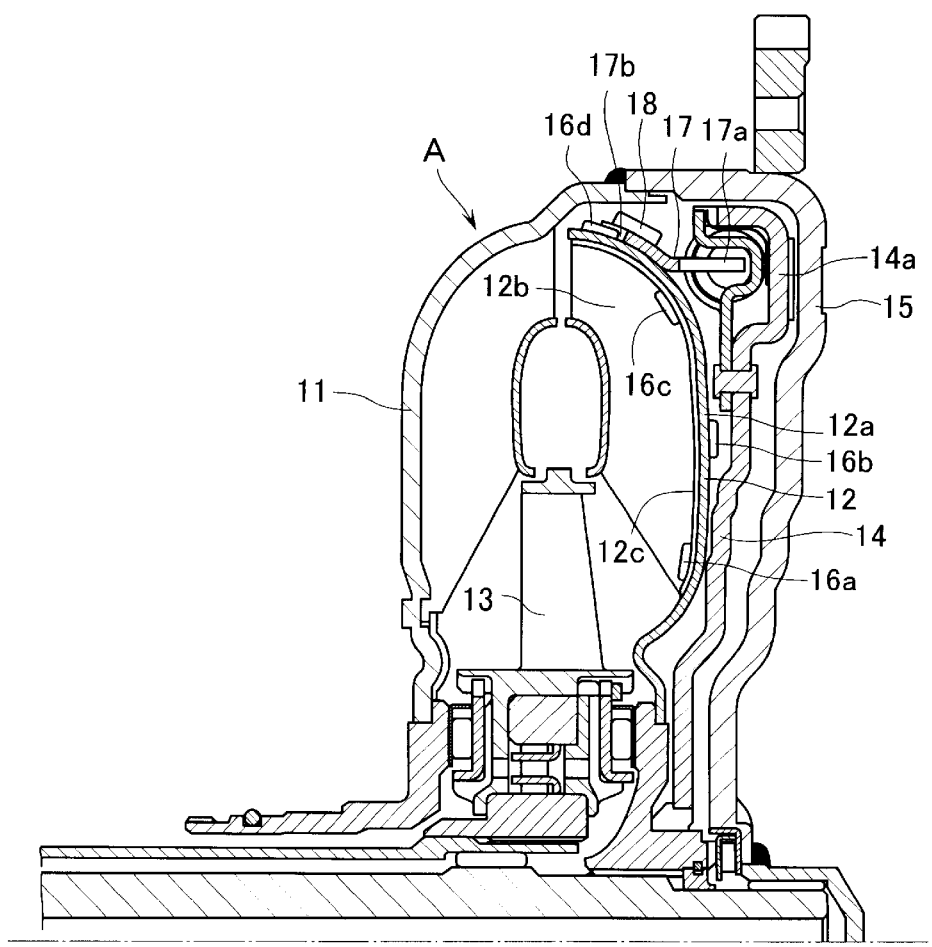
FIG. 6 is a sectional view of a torque converter in which the present invention is used.

FIG. 6 shows a torque converter "A" as one example of the hydraulic power transmitting apparatus in which the above-described means for fixing the blades is used in the impeller. The torque converter "A" is provided with a pump 11, a turbine 12, a stator 13, a clutch plate 14, and a front cover 15 which is integral with the pump 11. The above-described art of fixing the fixing flange of the blade and the shell together is applied to the turbine 12 in the illustrated example in FIG. 6. The turbine 12 is fixed to the inside of the shell 12a by means of four projections 16a, 16b, 16c, 16d. Two 16a, 16c of the projections project inward so as to avoid interference with the clutch plate 14.

Figure 7:
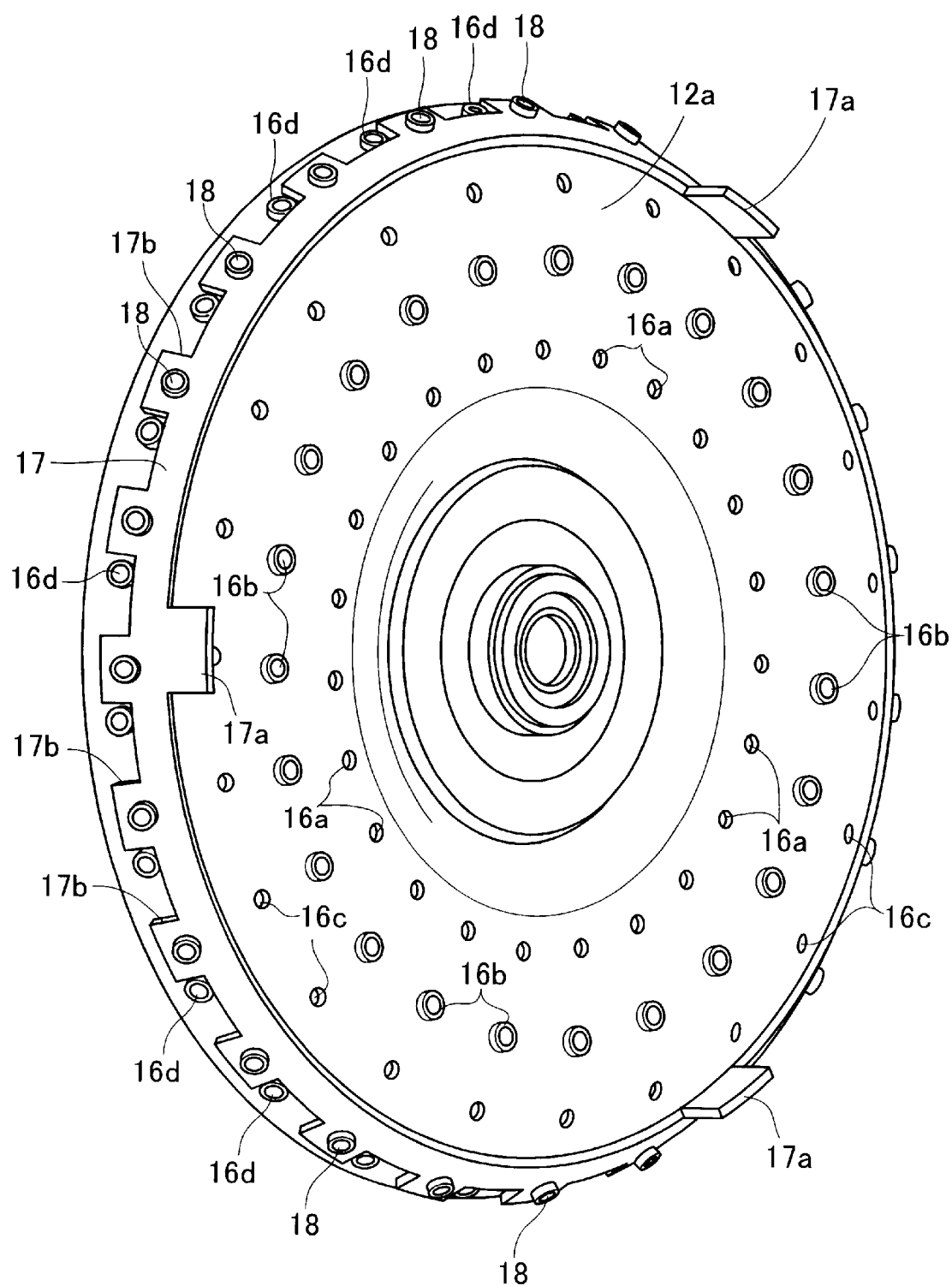
FIG. 7 is a perspective view of a turbine.

As shown in FIG. 7, near an outer circumference of the shell 12, there is firmly fixed a lock-up damper spring plate 17 by means of projections 18. Three claw pieces 17a are provided so as to be engaged with a spring disposed inside the spring holding portion 14a in the clutch plate 14. On the side opposite to the claw pieces 17a, there are provided a plurality of cut-away portions 17b so as to avoid the interference with the projections 16d that are in the outermost circumferential portion of the shell 12a.

Figure 8:
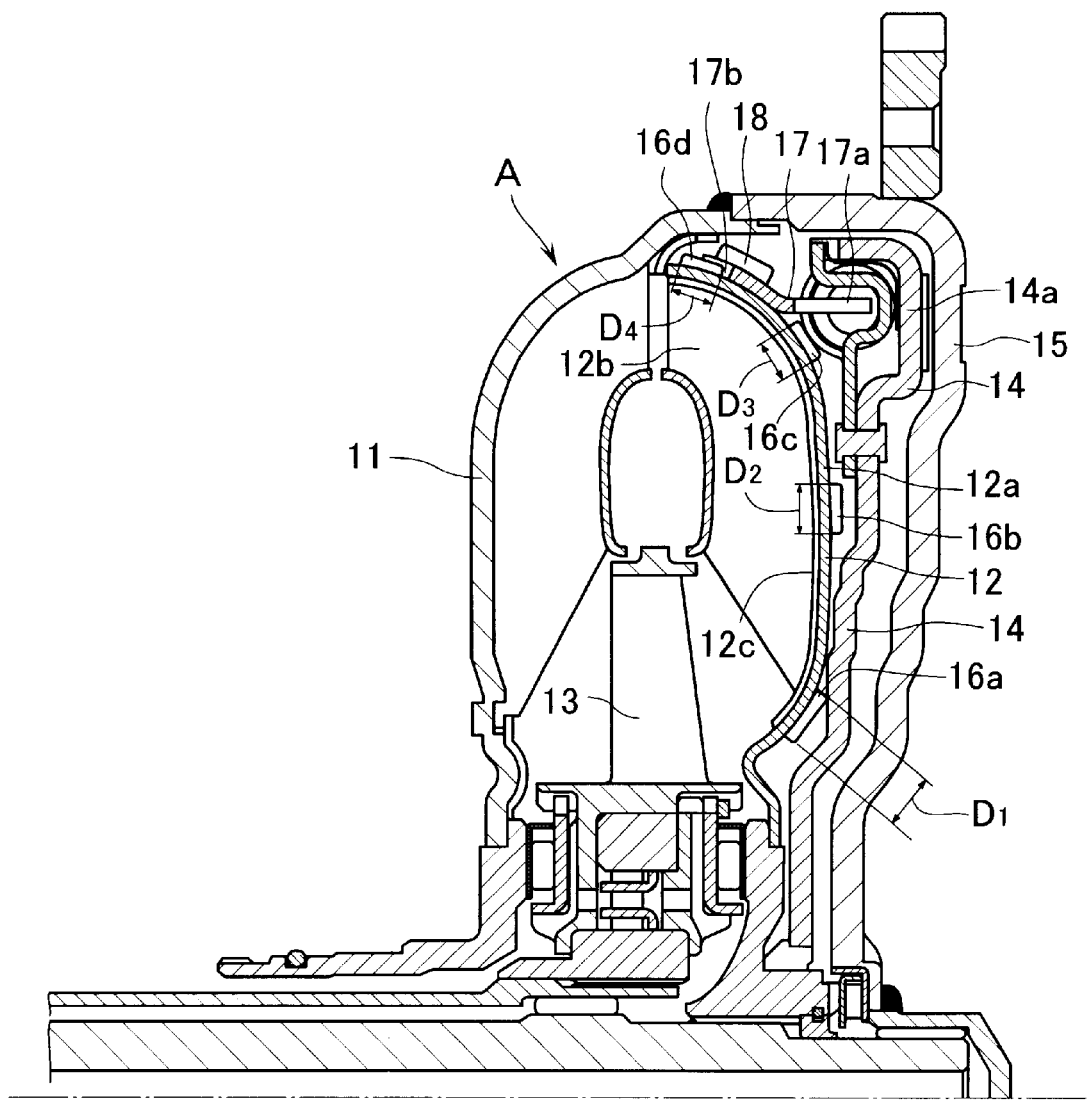
FIG. 8 is a sectional view of a torque converter according to a modified embodiment of the present invention.

In FIG. 8, among the projections 16a–16d for fixing each of the blades, the diameter $D_1$ of the projection 16a on a radially innermost portion of the shell 12a is set larger than the diameters $D_2$, $D_3$, $D_4$ of the other projections 16b–16d. This large-diameter projection 16a is arranged depending on the width of the fixing flange 3b of the blade as shown in FIGS. 2 and 5. The reason why the diameter of the projection 16a is made larger is to cope with a large force operating, on a radially inner circumference of the blade, toward the blade to peel off the fixing flange 3b As can be seen from the above explanations, according to the first aspect of the present invention, there is no need of subjecting the shell and the blades of the hydraulic power transmitting apparatus to the machining of providing slits or to the work of brazing. Therefore, the cost of manufacturing can be kept low. Further, there can be obtained a high-quality hydraulic power transmitting apparatus which is free from oil leaks through the fixing points and thermal strains. In addition, since the fixing flange which is bent from the blade has three-dimensional shape, the strength of the blade becomes high. As a result, the blade can be made thinner in thickness and smaller in weight. The projection which constitutes the fixing point has a feature in that the material of the inner member (i.e., one of the shell and the fixing flange of the blade) has an expanded portion which is cut or thrusted into the outer member (i.e., the other of the shell and the fixing flange of the blade), whereby the two members are fixedly connected together. Therefore, there is no direction in which the fixing force is stronger or weaker, i.e., the fixing force is strong in all directions. It follows that, even if the fixing point is small, a sufficient strength can be obtained.

According to the second aspect of the present invention, aside from the feature described with respect to the above-described first aspect, there is formed the hollow cylindrical projection having a bottom, the outer periphery of which is formed into an axially extended convex. Due to the presence of this ring-shaped convex, the diametrically expanded portion along the bottom of the outer peripheral portion of the inner member can be easily formed. There is thus an effect that the sure fixing construction can be obtained.

According to the third aspect of the present invention, one or a plurality of fixing points of the shell and the fixing flange of the blade can be pressed at one pressing operation. The disadvantages caused by the conventional method of brazing or caulking can be prevented. According to still other features, the following advantages can be obtained. Namely, by forming at least one of the projections to project inward of the impeller, the interference of the projection with the other constituting members can be prevented. Since at least one of the projections is positioned radially inward relative to the center of radial length of the blade, the fixing force on the inner-diameter side of the impeller is larger. Since the fixing flange has a larger width on a radially inner side and the diameter of the projection to be provided on the radially inner side is larger in diameter than the diameter of remaining projections, the projection can withstand a larger force of the working fluid which is operated to peel off the blade. The lock-up damper spring plate can be fixed to the outside of the turbine shell without an interference with the projection on the circumferentially outermost position and without giving rise to the generation of thermal strains.

It is readily apparent that the above-described impeller for a hydraulic power transmitting apparatus and the method of fixing blades of the hydraulic power transmitting apparatus meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An impeller for a hydraulic power transmitting apparatus, said impeller comprising:
    a shell;
    a plurality of blades fixed to said shell, each of said blades having a blade main body and a fixing flange which is bent at an angle relative to said blade main body;
    wherein said shell and said fixing flange are placed one on top of the other and are pressed together at a fixing point such that a hollow cylindrical projection having a bottom is formed; and
    wherein said projection comprises a diametrically expanded portion along a bottom outer periphery of that member out of said shell and said fixing flange which lies on an inner side in said projection, said expanded portion being thrusted into that member out of said shell and said fixing flange which lies on an outer side in said projection.

2. The impeller according to claim 1, wherein said projection is formed in a plurality of numbers.

3. The impeller according to claim 2, wherein at least one of said projections is projected inward of said impeller.

4. The impeller according to claim 2, wherein at least one of said projections is positioned radially inward relative to a center of a radial length of said blade.

5. The impeller according to claim 3, wherein at least one of said projections is positioned radially inward relative to a center of a radial length of said blade.

6. The impeller according to claim 2, wherein said fixing flange has a larger width on a radially inner side and wherein a diameter of a projection to be provided on a radially inner side is larger in diameter than the diameter of remaining projections.

7. The impeller according to claim 3, wherein said fixing flange has a larger width on a radially inner side and wherein a diameter of a projection to be provided on a radially inner side is larger in diameter than the diameter of remaining projections.

8. An impeller for a hydraulic power transmitting apparatus, said impeller comprising:
    a shell;
    a plurality of blades fixed to said shell, each of said blades having a blade main body and a fixing flange which is bent at an angle relative to said blade main body;
    wherein each of said shell and said fixing flange are placed one on top of the other and are pressed together at a fixing point such that a hollow cylindrical projection having a bottom is formed, an outer periphery of said bottom having an axially extending ring-shaped convex; and
    wherein said projection comprises a diametrically expanded portion along a bottom outer periphery of that member out of said shell and said fixing flange which lies on an inner side in said projection, said expanded portion being thrusted into that member out of said shell and said fixing flange which lies on an outer side in said projection.

9. The impeller according to claim 8, wherein said projection is formed in a plurality of numbers.

10. The impeller according to claim 9, wherein said and wherein at least one of said projections is projected inward of said impeller.

11. The impeller according to claim 9, wherein at least one of said projections is positioned radially inward relative to a center of a radial length of said blade.

12. The impeller according to claim 10, wherein at least one of said projections is positioned radially inward relative to a center of a radial length of said blade.

13. The impeller according to claim 9, wherein said fixing flange has a larger width on a radially inner side and wherein a diameter of a projection to be provided on the radially inner side is larger in diameter than the diameter of remaining projections.

14. The impeller according to claim 10, wherein said fixing flange has a larger width on a radially inner side and wherein a diameter of a projection to be provided on the radially inner side is larger in diameter than the diameter of remaining projections.

15. The impeller according to any one of claims 1 through 14, further comprising a lock-up damper spring plate having a shape free from interference with a projection that is on a circumferentially outermost position, said damper spring plate being fixed to an outside of said shell by a projection which is the same as said projection for fixing said shell and said fixing flange.

16. A method of fixing blades of a hydraulic power transmitting apparatus, said method comprising:

preparing a shell from a first metallic plate and a plurality of blades from a second metallic plate, each of said blades having an integrally formed fixing flange;

placing said shell and said fixing flange one on top of the other;

pressing said shell and said fixing flange together to form a hollow cylindrical projection such that a material in a corner portion of an inner member of said shell and said fixing flange inside said projection is expanded outward so as to be thrusted into a material of an outer member of said shell and said fixing flange inside said projection.

17. A method of fixing blades of a hydraulic power transmitting apparatus, said method comprising:

preparing a shell made of a first metallic plate and a plurality of blades made of a second metallic plate, each of said blades having an integrally formed fixing flange;

feeding said shell and each of said fixing flanges into a die assembly in a state in which one is placed on top of the other, said die assembly comprising: a die having a die hole with a bottom; and a punch which is adapted to be inserted into, and out of, the die hole; wherein a clearance between said punch and an inner surface of said die hole is smaller than a sum of thicknesses of said shell and said fixing flange, and wherein said die has a ring-shaped groove which is formed along a corner of the bottom of the die hole so as to extend in an axial direction of said die assembly;

pressing said shell and said fixing flange together to form a hollow cylindrical projection such that a material in a bottom corner portion of an outer member out of said shell and said fixing flange is forced into said ring-shaped groove and that a material in a bottom corner portion of an inner member of said shell and said fixing flange is expanded diametrically outward so as to be thrusted into the material of said outer member.

* * * * *